United States Patent
Evans et al.

(10) Patent No.: US 12,144,460 B2
(45) Date of Patent: Nov. 19, 2024

(54) COMBINATION BOTTLE WARMER AND COOLER

(71) Applicant: Babba Care Inc., San Diego, CA (US)

(72) Inventors: Daniel Royal Evans, San Diego, CA (US); Eric Gimson Harper, Poway, CA (US)

(73) Assignee: Babba Care Inc., San Diego, CA (US)

( * ) Notice: Subject to any disclaimer, the term of this patent is extended or adjusted under 35 U.S.C. 154(b) by 0 days.

(21) Appl. No.: 18/513,511

(22) Filed: Nov. 18, 2023

(65) Prior Publication Data
US 2024/0197107 A1 Jun. 20, 2024

Related U.S. Application Data

(60) Provisional application No. 63/433,929, filed on Dec. 20, 2022.

(51) Int. Cl.
*A47J 36/24* (2006.01)
*F25B 21/04* (2006.01)
*G05D 23/19* (2006.01)

(52) U.S. Cl.
CPC ........... *A47J 36/2433* (2013.01); *F25B 21/04* (2013.01); *G05D 23/1951* (2013.01); *A47J 2202/00* (2013.01); *F25B 2321/0212* (2013.01)

(58) Field of Classification Search
CPC ........ F25B 2321/025; F25B 2321/0251; F25B 2321/0252; F25B 21/02; F25B 21/04; F25B 2321/02; F25B 2321/021; F25B 2321/0211; F25B 2321/0212; F25B 2321/023; A47J 36/2433; A47J 2202/00; G05D 23/1951
See application file for complete search history.

(56) References Cited

U.S. PATENT DOCUMENTS

| | | | |
|---|---|---|---|
| 4,996,847 A * | 3/1991 | Zickler | F25B 21/02 62/3.64 |
| 6,732,533 B1 | 5/2004 | Giles | |
| 10,842,718 B2 | 11/2020 | Kessels et al. | |
| 11,517,145 B2 | 12/2022 | Alexander et al. | |
| 2004/0140304 A1 | 7/2004 | Leyendecker | |
| 2006/0000221 A1* | 1/2006 | Culp | F25B 21/02 62/3.6 |

(Continued)

FOREIGN PATENT DOCUMENTS

| | | | |
|---|---|---|---|
| JP | 09061032 A * | 3/1997 | ............ F25B 21/04 |
| WO | 2014158655 A2 | 10/2014 | |

OTHER PUBLICATIONS

English Machine Translation JP-09061032-A. Accessed Jun. 21, 2024.*

(Continued)

*Primary Examiner* — Tavia Sullens
(74) *Attorney, Agent, or Firm* — Cognition IP, P.C.; Edward Steakley; Saleh Kaihani (57) ABSTRACT

A combination bottle warmer and cooler device can include a thermally conductive medium plate in thermal contact with a thermoelectric module. Liquid can be brought into thermal contact with the medium plate. A temperature sensor can sense the temperature of the medium plate. A controller can receive the temperature readings of the sensor and apply a voltage differential to the thermoelectric module in order to warm or cool the liquid.

7 Claims, 5 Drawing Sheets

(56) References Cited

U.S. PATENT DOCUMENTS

| | | | | |
|---|---|---|---|---|
| 2011/0289939 | A1* | 12/2011 | Lu | F25B 21/04 |
| | | | | 62/3.61 |
| 2014/0318153 | A1* | 10/2014 | Ilercil | F25B 21/04 |
| | | | | 62/3.3 |
| 2017/0325608 | A1* | 11/2017 | Alexander | A47G 19/2288 |
| 2018/0087812 | A1* | 3/2018 | Armstrong | F25B 21/04 |
| 2019/0223635 | A1 | 7/2019 | Alexander | |
| 2019/0242636 | A1* | 8/2019 | Tsuno | F25B 21/02 |
| 2021/0007547 | A1 | 1/2021 | Moksin et al. | |
| 2022/0268495 | A1* | 8/2022 | Alexander | F25B 21/04 |

OTHER PUBLICATIONS

International Search Report and Written Opinion of the International Search Authority in international application No. PCT/US2023/080422, mailed Feb. 7, 2024.

* cited by examiner

FIG. 4

COMBINATION BOTTLE WARMER AND COOLER

CROSS-REFERENCE TO RELATED APPLICATIONS

This application claims the benefit of priority of U.S. Provisional Patent Application No. 63/433,929, filed on Dec. 20, 2022, titled "COMBINATION BOTTLE WARMER AND COOLER," which is hereby incorporated in its entirety and should be considered a part of this disclosure.

BACKGROUND

Field

This invention relates generally to the field of temperature-controlled chambers, and more particularly to temperature-controlled chambers for warming and cooling liquids.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

For the first few years of a baby's life, a baby is dependent on breastmilk or formula for sustenance and nutrition. Some parents use bottle feeding to provide breastmilk and/or baby formula to an infant. Bottle feeding can however introduce challenges. Breastmilk and formula are perishable substances that need to be maintained at cold temperatures during storage. At feeding time, however, many babies prefer a warmer or body temperature milk. The various temperature requirements of breastmilk or formula for storage and feeding are more easily met at home, but are particularly challenging when the parents want to bottle feed an infant outside their home, where access to kitchen appliances are limited. At home, the parents can store the formula or breastmilk in the freezer or in the refrigerator and use a variety of kitchen appliances to safely warm the milk when needed. For example, a bottle with cold milk can be placed in a cup and hot or boiling water from a kettle can be poured inside the cup, partially submerging the bottle and warming the milk from the outside of the bottle. Outside the house, however, the parent's access to kitchen appliances, such as a refrigerator or a kettle is limited.

Regardless of access to heating and cooling appliances, warming and cooling baby formula with such appliances, inside or outside the house, can be imprecise and frustrating to the parents. For example, while the parents can use ice chests or insulated coolers to store the milk at cooler temperatures when they don't have access to a refrigerator, the temperature of ice chests or insulated coolers begin to rise as time passes, forcing the parents to use or discard the milk, or find alternative cooling methods. This can lead to unsafe storage or spoilage of valuable breastmilk or formula. Similarly, for feeding, achieving an optimal feeding temperature in time for a hungry infant to drink can be imprecise and frustrating. For example, the method of submerging the bottle with cold milk in warm or boiling water can raise the temperature of the milk too high, requiring another method to bring the temperature of the milk down to a safe level for the infant to drink. For example, a parent might have to use an ice bath or put the bottle back in the refrigerator or freezer to quickly bring the temperature of the milk back to a safe drinking level. A parent might have to repeat the cycle of warming and cooling several times, until by trial and error a safe drinking temperature can be reached. A parent tasked with feeding a hungry and crying infant can find the process of cooling and warming milk in this fashion frustrating. The problem is only exacerbated, for caregivers in daycares and child care centers that have to cool and/or warm multiple bottles for several infants throughout the day.

The heating and cooling of the milk using traditional methods, such as submerging a bottle in hot or cold water can be frustratingly imprecise, yet many existing solutions to the problem of storage and warming of breastmilk and formula rely on such techniques. For example, some mobile baby storage and warming solutions, require a parent to store the bottle containing milk in an ice chest or a cooler, and carry an insulated container of hot water and a warming reservoir. When it is time to feed a baby, the parent removes the bottle from the cooler and places it in the warming reservoir. The parent can pour the hot water from the container into the warming reservoir, which partially submerges the bottle in the hot water, warming the milk inside the bottle. This and similar techniques, in addition to being imprecise can be additionally frustrating if the weight of the bottle is too light to be submerged enough for efficient heat transfer from the hot water to the milk.

Another frustrating aspect of some existing solutions to bottle cooling and warming is that the two needed functions are implemented in two separate solutions, requiring the parent to carry one solution for cooling and storage and one solution for heating the milk and preparing it for feeding. For example, some heating solutions provide a heat-conductive chamber in contact with a heating coil hidden inside a housing. The parent can pour the milk in the chamber. The heating coil can warm the chamber and the milk inside the chamber. Some cooling solutions are essentially a double-chamber housing, where an inner chamber is surrounded by an insulated outer chamber, creating a space for ice or ice water in the space between the chambers. The outer chamber exposed to the ambient is insulated, for example is double-walled or vacuum-insulated, keeping the heat out of the interior of the housing and the inner chamber. The milk poured into the inner chamber can be kept cool. These and similar solutions achieve cooling or heating functionality with separate devices. A parent would typically have to carry and use two different devices or solutions, one for cooling and one for heating. Furthermore, transferring breastmilk or formula from one device to another can create cross-contamination risk, making these devices less efficient for their intended purpose.

SUMMARY

The appended claims may serve as a summary of this application.

BRIEF DESCRIPTION OF THE DRAWINGS

These drawings and the associated description herein are provided to illustrate specific embodiments of the invention and are not intended to be limiting.

DETAILED DESCRIPTION

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

Figure 1:
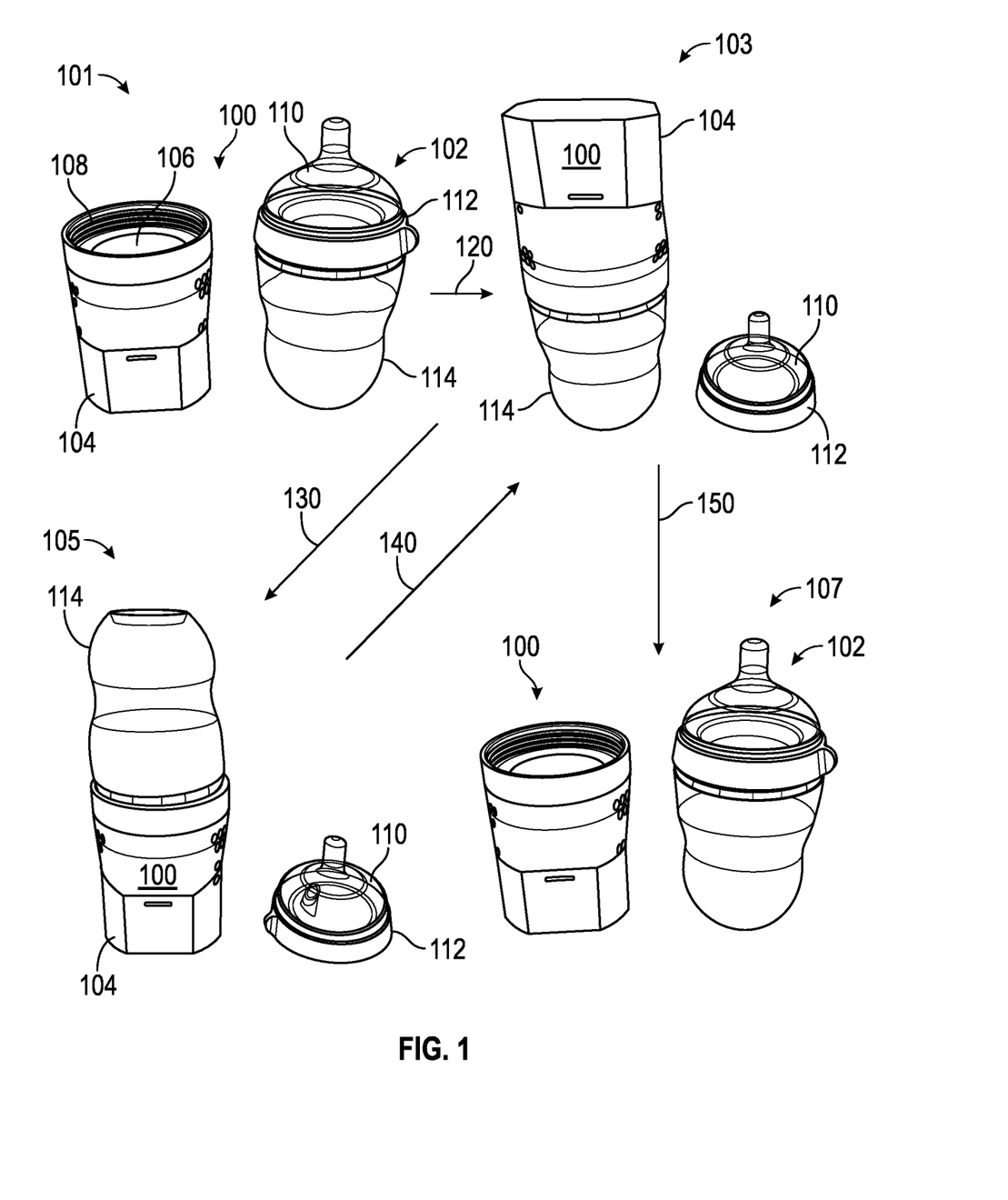
FIG. 1 illustrates diagrams, showing how a parent can use a combination bottle warmer and cooler device according to an embodiment.

FIG. 1 illustrates diagrams 101, 103, 105 and 107, showing how a parent can use a combination bottle warmer and cooler device 100 according to an embodiment. In the diagram 101, the device 100 is shown next to a typical baby bottle 102. The device 100 can be implemented in a variety of ways. In one implementation, the device 100 can include a housing 104 enclosed in part by a thermally conductive medium 106. The housing 104 can also include threads 108 matching and shaped to be able to receive the threads on the reservoir section of the bottle 102, or an adapter via which the bottle 102 can removably attach to the threads 108. The inner components of the device 100 can both heat and cool the medium 106 as will be described later.

The bottle 102 can typically include a nipple section 110, a cap ring 112 and a reservoir 114. The nipple section 110 can removably attach to the cap ring 112, holding it securely in place. The cap ring 112 can be rotatably attached to the threads on the mouth of the reservoir 114, creating a seal between the reservoir 114 and the nipple section 110, where the liquid inside the reservoir 114 can only exit from the top of the nipple section 110, allowing a baby to suck milk from the bottle through the nipple section 110. The Diagram 103 shows, the cap ring 112 and the nipple section 110 detached from the reservoir 114, allowing the device 100 to attach on top of the reservoir 114, where the nipple section 110 and the cap ring 112 were previously attached. The device 100 can rotatably attach to the reservoir 114 via the threads 108. In some embodiments, the attachment of the device 100 and the reservoir 114 can be via an adapter with compatible threads on either side for the device 100 and the reservoir 114.

The diagram 105 shows how the device 100 attached to the reservoir 114 can be flipped upside down or rotated in the direction of gravity to allow the liquid in the reservoir 114 to come in contact with the medium 106 by force of gravity. The diagram 105 shows an orientation of the device 100 attached to the reservoir 114 via which the liquid inside the reservoir can be stored at a cool temperature and also warmed to a safe and desirable temperature for feeding. The medium 106 (not visible in the diagram 105) can remove heat from the liquid during the cooling operations and can add heat to the liquid during the warming operations. A software application in wireless communication with the device 100 can allow a parent to monitor or set a temperature of the liquid inside the reservoir 114. The diagram 107 shows when the milk inside the reservoir is heated to a target temperature and is ready for feeding. The parent can rotate the device and the reservoir in the direction of gravity to allow the milk to fully settle in the reservoir. The parent can then untwist and detach the device 100 from the reservoir 114 and reattach the nipple section 110 and cap ring 112 to ready the bottle for feeding.

To use the device 100 in the embodiment described above, a parent performs operations 120, 130, 140 and 150. In the operation 120, the parent unscrews the nipple section 110 and the cap ring 112 from the bottle 102 and screws the device 100 unto the reservoir 114 as shown in the diagram 103. In the operation 130, the parent flips over the device and the attached reservoir, placing the reservoir on top of the device 100 in the direction of gravity, so that the force of gravity brings the liquid inside the reservoir in contact with the medium 106, as shown in the diagram 105. The device 100 cools the liquid for storage, or heats the liquid for feeding, depending on the input received from the parent and/or a software application. In the operation 140, when the liquid is ready for feeding, the parent flips over the device attached to the reservoir to place the device on top of the reservoir, relative to the direction of gravity, pulling the liquid inside the reservoir and away from the device into the reservoir, as show in the diagram 103. Once the liquid is fully accumulated in the reservoir, the parent can perform operation 150, removing the device 100, for example by a twisting motion, and reattaching the nipple section 102 and the cap ring 112 to make the bottle ready for feeding. The parent can repeat the operations 120, 130, 140 and 150 if there is a need to restore left over milk or perform the feeding another time.

Figure 2:
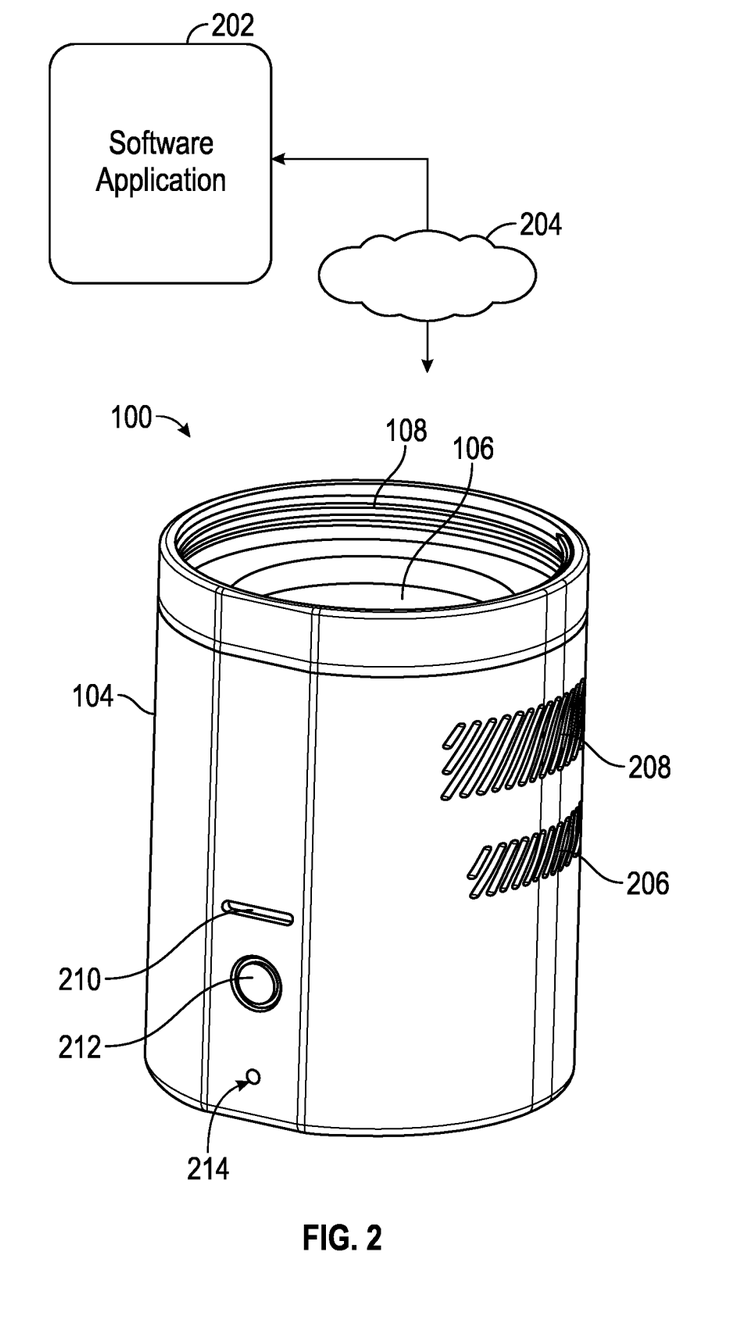
FIG. 2 illustrates a diagram of the exterior of the combination bottle warmer and cooler device.

FIG. 2 illustrates a diagram of the exterior of the combination bottle warmer and cooler device 100 and the housing 104. The device 100 can be in wired or wireless communication with a software application 202 via the network 204. The network 204 can be a wired or wireless communication network, although a wireless network is more preferred. The device 100 can be equipped with communication and/or power management ports (not shown). In a preferred embodiment, the device 100 includes secondary batteries, for example, lithium-ion rechargeable batteries and a compatible charging port for recharging the batteries. Although, primary batteries can also be used, and may be more preferred in some applications.

The software application 202 can be a user interface via which a parent can interact with the device 100. The software application 202 can be executed on a variety of computing devices, including on a cloud infrastructure. For example, a parent can run or otherwise access the software application 202 on a smartphone, tablet, smart watch, smart glasses, laptop, and/or desktop. In some embodiments, the software application 202 can be a cloud-based application, allowing a parent to access the software application 202 or receive notifications from the software application 202 via any of the parent's computing devices, authorized to access the software application 202. Various user interactions are possible via the software application 202. For example, the parent can monitor the temperature of the reservoir 114 when the reservoir is attached to the device 100 and receive various notifications and alerts, related to the functionality of the device 100, such as when the liquid reaches a target temperature or when low battery conditions are detected. The software application 202 can also be used to implement scheduling functionality. For example, when a parent knows that a 2 a.m. feeding occurs with some regularity, she can attach a reservoir 114 with milk to the device 100 and schedule the device 100 to make the milk ready for a 2 a.m. feeding. The device 100 maintains a cool temperature of the milk until shortly before the scheduled feeding time, and switches to heating mode, for example at 1:50 a.m. and achieves a safe feeding temperature by 2 a.m. The parent can also adjust or input the cooling target temperature and the feeding target temperature, depending on the desired temperature milk that his or her baby prefers.

In some embodiments, the functionality of the software application 202 can be wholly or partially implemented via external hardware and user interface elements, such as LED lights and/or one or more physical buttons, placed on the exterior of the housing 104. As such, the software application 202 is not necessary in every embodiment. In some embodiments, one or more physical buttons on the external surface of the housing 104 can trigger preset or pre-programmed parameters for the operations of the device 100. For example, in some implementations of the device 100, one or more buttons on the exterior surface of the housing 104 can be programmed to place the device 100 in various operation modes. One operation mode can be a "cooling mode," where the device 100 targets a preset cooling temperature (e.g., 40 degrees Fahrenheit). Another mode can be a "heating mode," where the device 100 targets a preset heating temperature (e.g., 99 degrees Fahrenheit).

The device 100 includes the housing 104 within which the various components of the device 100 can be secured. As will be described, some embodiments, utilize a heatsink and fan combination. In those embodiments, the housing 104 can include an inlet vent 206 via which the fan can draw fresh ambient air to blow into the heat sink and expel the hot air from the heatsink into an outlet vent 208.

The exterior of the device 100 can include user interface elements, such as a status light emitting diode (LED) 210, a button 212 and a charging LED 214. The LEDs can light up with different colors, or blink depending on their functionality. For example, a blue-colored status LED 210 can indicate the device 100 is cooling the liquid. A red-colored and blinking status LED 210 can indicate the device 100 is warming the liquid. A solid red-colored status LED 210 can indicate the liquid has reached a target feeding temperature. A blinking white-colored status LED 210 can indicate an error message. Other methods of usage of LED and LED color coding can also be used for various status indications. Similarly, the charging LED 214 can be used to convey the charging status of the device 100 to a parent. The button 212 can be a multi-function button. For example, by pressing the button 212 once, the device can start cooling, by pressing and holding the button 212 for a few seconds, the device 100 can start heating the liquid. Other usages of the button 212 can also be implemented. Persons of ordinary skill in the art can build the device 100 with the same or different external user interface elements, without departing from the described technology.

Figure 3:
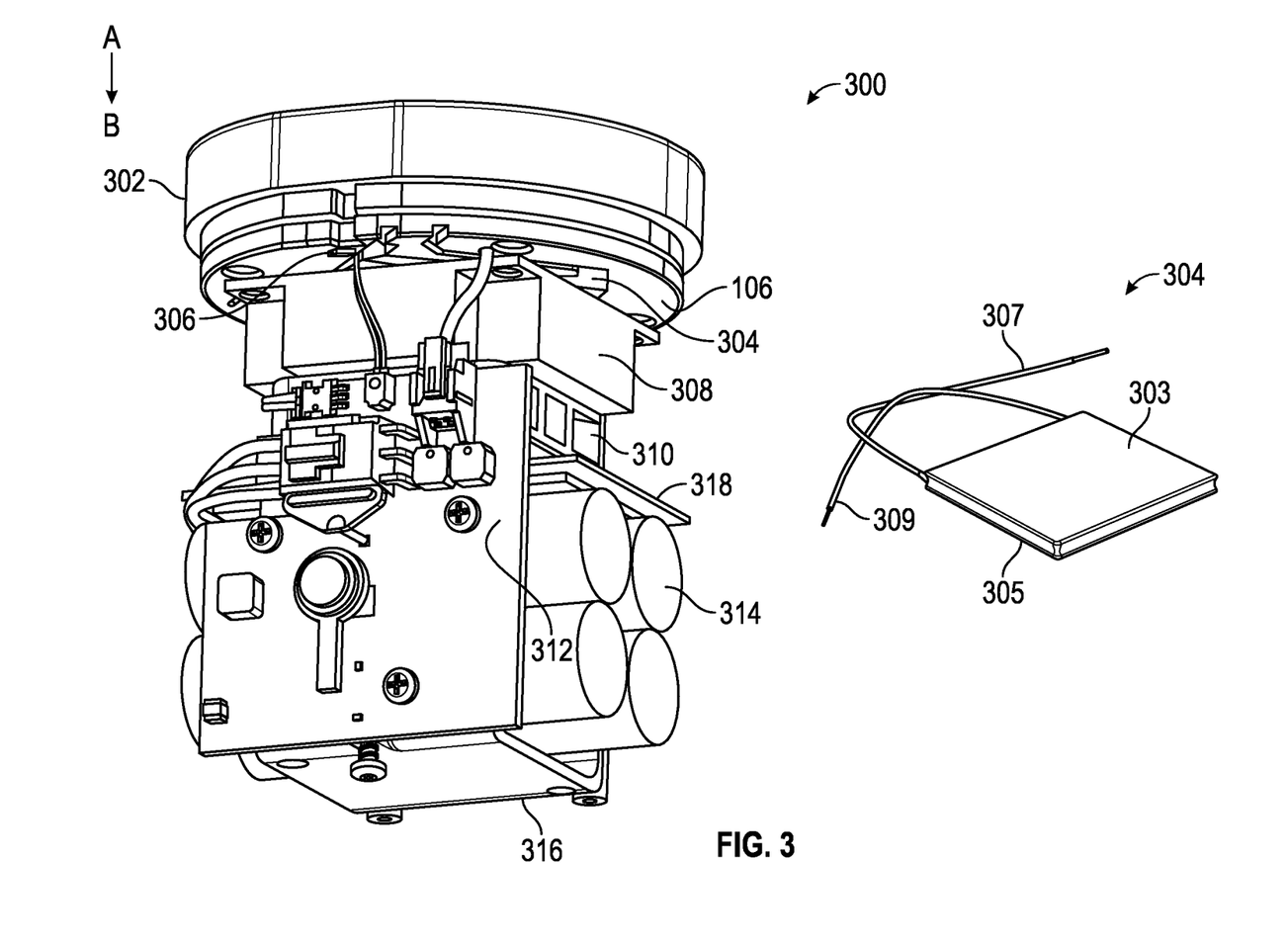
FIG. 3 illustrates a diagram of the internal components of the combination bottle warmer and cooler device.

FIG. 3 illustrates a diagram 300 of the internal components of the device 100. Referencing FIGS. 1 and 3, the diagram 300 shows the internal components of the device 100, relative to the opening 302 of the top or mouth of the housing 104. The opening 302 of the housing 104 includes the threads 108. The internal components of the device 100 will be described in the direction A-B or the direction of force of gravity when the device 100 is detached from a reservoir 114 and resting on a surface. The top or mouth of the device 100 is where the threads 108 and the medium 106 are located. The opening 302 can includes the medium 106 enclosing the interior components of the device 100. In other words, the medium 106 is an externally facing component of the device 100, sealing the internal components of the device 100 from the outside. As described earlier, the medium 106 is in contact with the liquid in an attached reservoir. In some embodiments, a gasket between the medium 106 and the opening 302 seals the interior space of the housing 104 and prevents any liquid from a reservoir 114 to flow into the internal components of the device 100.

Adjacent and below the medium 106, the device 100 can include a thermoelectric module 304 in thermal contact with the medium 106. The thermoelectric module 304 can be a plate that has a medium-side 303 adjacent and in thermal contact with the medium 106 and an opposite ambient-side 305 away from the medium 106. Applying a voltage differential to the sides 303, 305 of the thermoelectric module 304 can generate a temperature difference between the sides 303, 305. The thermoelectric module 304 can include wires 307, 309, via which the thermoelectric module 304 can receive an applied current or voltage. Depending on the direction and amount of electrical current flow through the wires 307, 309, one side can draw heat from the other side. By changing the direction of the current flow through the wires 307, 309, the direction of the heat transfer can be switched. Therefore, the thermoelectric module 304 can be used to hot or cool the medium 106 and in turn any fluid that is in thermal contact with the medium 106.

A voltage differential applied to the thermoelectric module 304 generates a temperature differential between the two sides 303, 305 of the thermoelectric module 304. In some implementations, the temperature differential can be relatively constant. In those embodiments, the temperature of the ambient-side 305 is kept as close to ambient as possible, thus allowing the medium-side 303 to get as cold or as warm as possible to reach or maintain a target temperature. To keep the ambient-side 305 of the thermoelectric module 304 as close to ambient temperature as possible, a heatsink 308 adjacent and below the thermoelectric module 304 can be used. Adjacent and below the heatsink 308, a fan 310 can be used to keep the heatsink temperature as close to ambient temperature as possible by extracting heat from the heatsink and/or by pushing ambient-temperature air into the heatsink. In reference to FIG. 2, the inlet, outlet vents 206, 208 can allow the fan and the heatsink to draw ambient-temperature air through the heatsink or expel hot air into the ambient, allowing the ambient-side 305 of the thermoelectric module 304 to be as close to ambient temperature as possible. Targeting ambient temperature for the ambient-side 305 allows the medium-side 303 to get as hot or as cold as necessary to reach or to maintain a target temperature of the liquid.

The thermoelectric module 304 can include a ceramic plate with a plurality of embedded transistors that allow the current- or voltage-controlled temperature behavior of the module. Switching the direction of the applied current and/or voltage to the wires 307, 309 can determine the heat flow transfer direction between the sides 303, 305 of the thermoelectric module 304. Additionally, the amount of applied voltage or current applied to wires 307, 309 can determine the rate of heat transfer between the sides 303, 305. Consequently, the direction and the amount of a voltage and/or current applied to the wires 307, 309 can be modulated to reach and/or maintain a target temperature of the thermoelectric module 304. In some embodiments, an H-bridge component can be used to switch the direction of an applied current and/or voltage to the wires 307, 309.

Pulse width modulation (PWM) or duty cycling can also be used to control the amount of a current and/or voltage applied to the thermoelectric module 304, which in turn can control the temperature of the thermoelectric module 304.

A temperature sensor 306 can be attached to the medium 106 to provide temperature readings based on which the direction and amount of current and/or voltage applied to the thermoelectric module 304 can be modulated to reach and/or maintain a target temperature. A variety of temperature sensors including infra-red or contact-based temperature sensors can be used to implement the temperature sensor 306. A controller 312 can be used to receive the output of the temperature sensor 306 and modulate a current and/or voltage applied to the wires 307, 309, based on the output of the temperature sensor 106 and a target temperature for a liquid in contact with the medium 106. In one embodiment, the controller 312 can be cost-effectively implemented via a printed circuit board (PCB) and a plurality of transistors thereon to implement the firmware controlling the operations of the device 100. The controller 312 can also include components to handle communication with an external firmware, such as the software application 202, as discussed in relation to FIG. 2. Other logic or controller circuits, for example, such as microprocessors can also be used.

In some embodiments, the medium 106 is constructed of a stainless-steel plate, but any durable thermally conductive material can be used as well. The medium 106 can be attached to the thermoelectric module 304, via a thermal paste material. The thermal paste material can be a flexible material that provides efficient heat transfer between the components. Some varieties of thermal paste can be permanently flexible and not dry out, and other varieties can be thermal cement, drying and solidifying into a form of permanent glue between the components. Both types of thermal paste can be used. The thermal paste can be used between other components as well. For example, the interface of the heatsink 308 and the thermoelectric module 304 can also include the thermal paste. The heatsink 308 can be constructed via an extrusion manufacturing technique, or via a skiving manufacturing technique or other techniques. In some embodiments, the reservoir 114 and/or the attached device 100 can be shrouded in a removable and thermally insulating sleeve to improve the thermal performance of the device and the attached reservoir system as a whole. In some embodiments, the reservoir 114 can be shrouded in a removable thermally insulating silicone to achieve better thermal performance. In other embodiments, the reservoir 114 can be constructed as a chamber with an internal insulated compartment to retain the temperature of milk or other liquid. For example, the reservoir 114 can be a vacuum-insulated flask, having an internal chamber surrounded by double layers sandwiching a vacuum layer. The double layers with a vacuum layer in-between can substantially increase the thermal retention properties of the reservoir 114. Other insulated chambers can also be used for the reservoir 114.

The source of power for the device 100 can be provided from one or more secondary batteries 314. While a four-pack battery pack is shown, the described embodiments are not so limited. Various battery packs in different numbers and different capacities can be used, depending on various implementations of the device 100. The controller 312 can also include a battery management module to manage the handling of the battery, for the application-specific purpose of the device 100. For example, duty cycling can be used, as part of managing the power draw from the battery to control the temperature of the thermoelectric module 304. For example, if the batteries 314 can provide a maximum voltage of approximately 10 Volts and if the controller 312 determines that the thermoelectric module 304 requires 5 Volts for 1 minute to maintain a target temperature, the controller 312 can pulse width modulate the voltage drawn from the batteries 314 at 50% to apply an appropriate amount of voltage to the thermoelectric module 304. The batteries 314 can be implemented via a variety of technologies, including lithium-ion rechargeable batteries, lithium-polymer rechargeable batteries, or other rechargeable batteries. While secondary batteries are preferred in some embodiments, primary batteries can also be used, and may be preferable in some embodiments, as the parents can swap them if no source of electricity is available (e.g., during remote camping trips). The batteries 314 and other components can be secured inside the housing 104 with a variety of techniques. For example, a bracket 316 and a shelf 318 can be used to mount the internal components of the housing 104 onto one another, onto the bracket 316 and/or the shelf 318.

Figure 4:
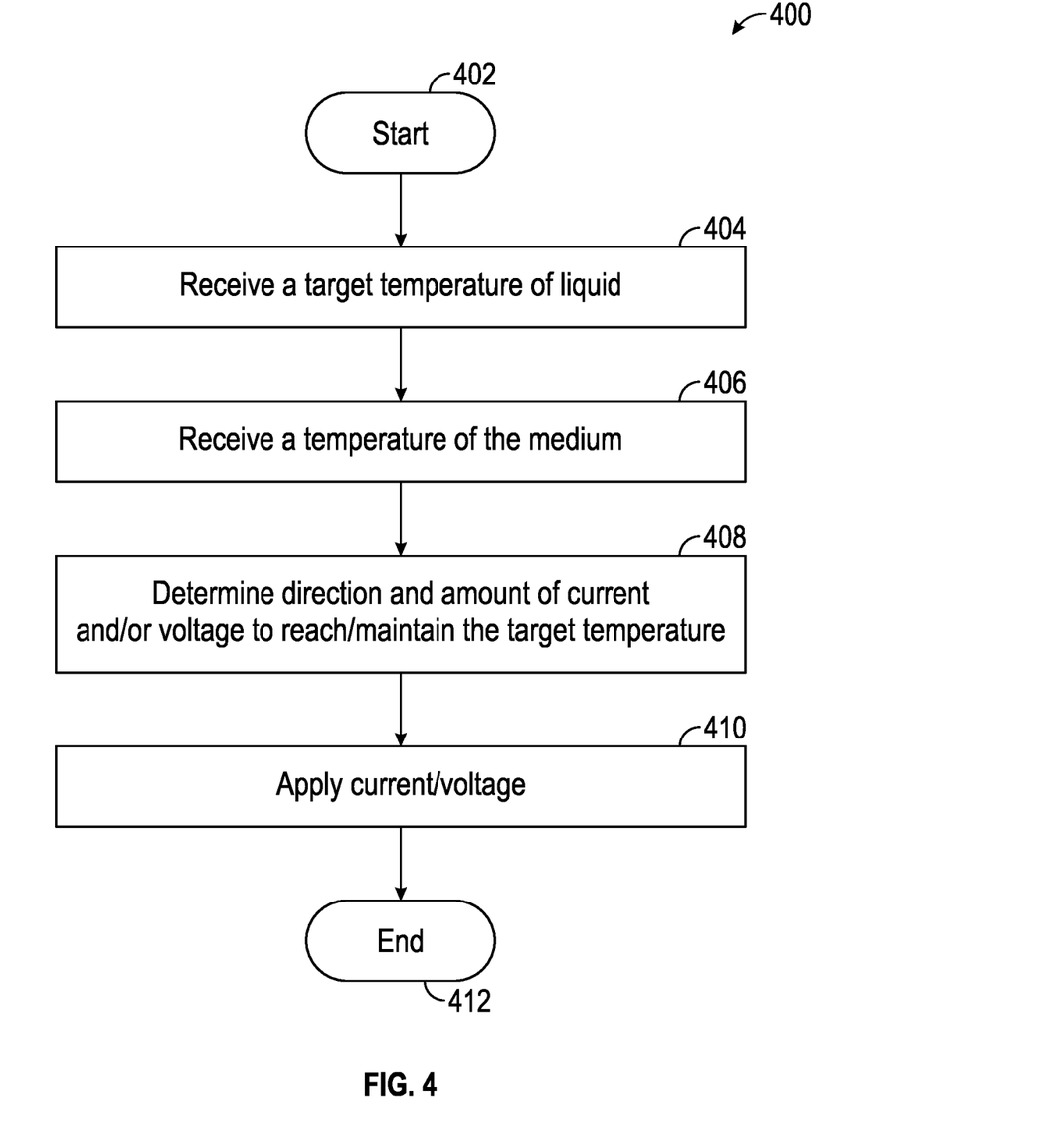
FIG. 4 illustrates a flowchart of a method of the operations of a controller of the combination bottle warmer and cooler device.

FIG. 4 illustrates a flowchart of a method 400 of the operations of the controller 312. The method starts at step 402. At step 404, the controller 312 can receive a liquid target temperature. The liquid in this application can be formula or breastmilk. The target temperature can be received from a parent via the software application 202, or can be received via a default parameter when an input from the parent is not received. The target temperature can also be received via a user interface element on the housing of the device 100, for example, via the button 212 as shown in FIG. 2. The target temperature can be a cooling temperature or a warming temperature. The cooling temperature is used for longer durations and for keeping the milk at a safe storage temperature to avoid spoilage. The warming temperature is used when a feeding time is near and the milk is heated to a target temperature, for example, body temperature for feeding a baby.

At step 406, the controller 312 can receive a temperature reading of the medium 106 via the temperature sensor 306. At step 408, the controller 312 determines an amount and direction of current and/or voltage to apply to the thermoelectric module 304 in order to move the temperature of the medium 106 to the target temperature or to maintain the temperature of the medium 106 at the target temperature. As described earlier, the controller 312 can modulate the current and/or voltage applied to the thermoelectric module 304 to make the medium-side 303 of the thermoelectric module 304 hot or cold, depending on the difference between the temperature of the medium 106 and the target temperature received at step 404. At step 410, the controller 312 applies the amount and the direction of the current and/or voltage determined at step 408. The controller 312 can continuously monitor the temperature of the medium 106, relative to the target temperature and/or any newly received target temperature and repeat the steps 404, 406, 408 and 410 to achieve or maintain the target temperature. The method ends at step 412, for example, when the device 100 is turned off and/or is detached from any reservoir 114.

Figure 5:
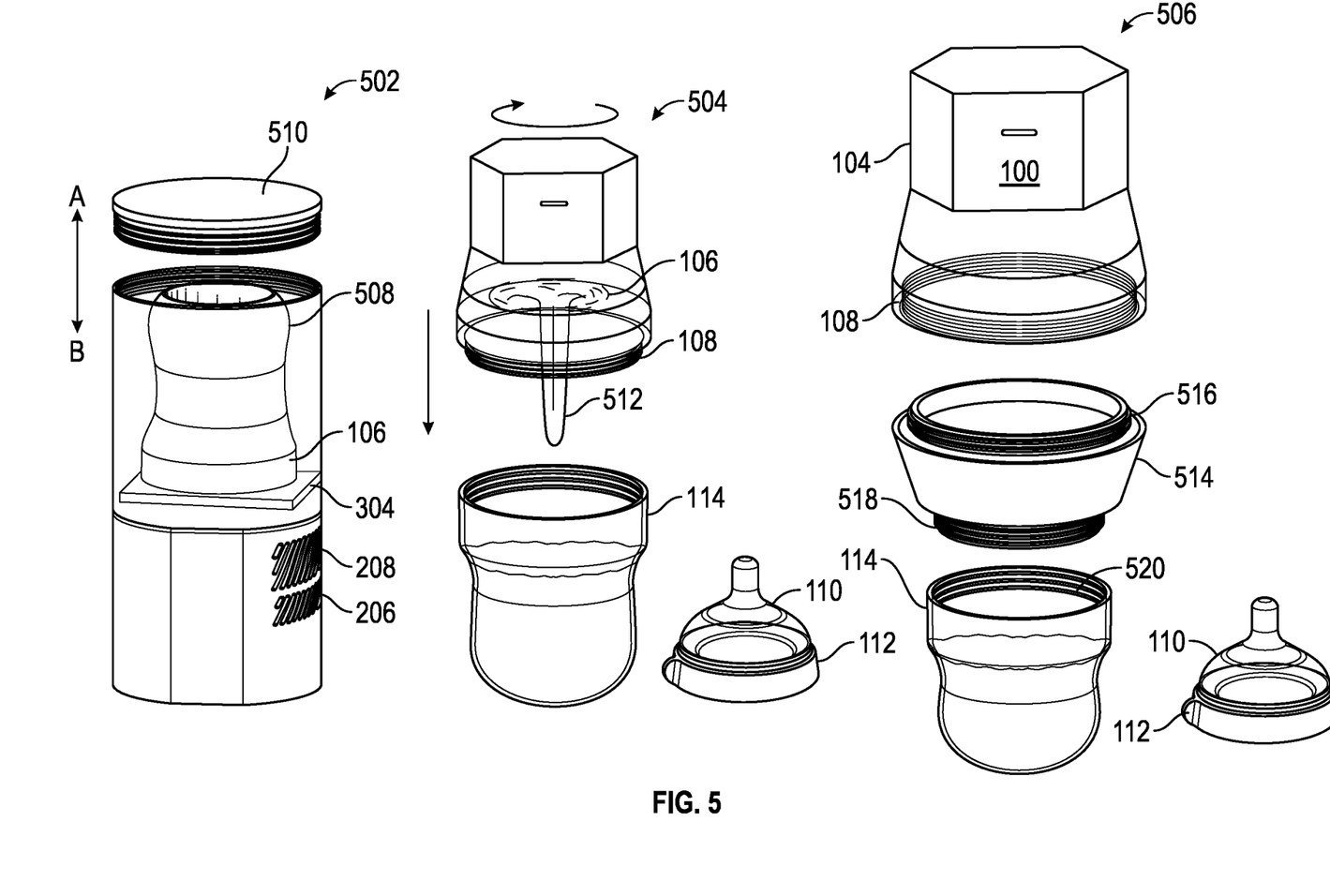
FIG. 5 illustrates diagrams of alternative embodiments of the combination bottle warmer and cooler device.

FIG. 5 illustrates diagrams of alternative embodiments of the device 100. The device 502, relative to the device 100 described above, is extended in the vertical direction B-A to include a chamber 508. Besides the chamber 508, the device 502 includes the same components as the device 100 described above. The chamber 508 is thermally coupled to the medium 106, for example via thermal paste or via soldering. Alternatively, the chamber 508 and the medium 106 can be forged from the same thermally conductive material as one component. The medium 106 is thermally coupled to the thermoelectric module 304. Not all components of the device 502 are shown, but they are the same components and in the same orientation as described above in relation to the device 100. The chamber 508 can be insulated with a variety of techniques to improve its thermal performance in the device 502. For example, the chamber 508 can be a double-walled, vacuum-sealed chamber. To use the device 502, the parent can pour milk into the chamber 508 and close the device 502 via a cap 510. The device 502 can sense the temperature of the medium 106 and can cool or warm the chamber 508 by applying a voltage differential to the thermoelectric module 304 in the same manner as described above. When the milk is ready for feeding, the parent can open the cap 510, lift the device 502 and pour the milk from the chamber 508 into a reservoir 114 of a bottle 102 for feeding. Compared to the device 100 described above, the device 502 can be more intuitive to use, as it does not require the parent to perform the operations 120, 130, 140 and 150, as described above in relation to FIG. 1.

The device 504 is also similar to the device 100, but the medium 106 includes a rod portion 512. The medium 106 in the device 504 includes a plate portion similar to the medium 106 in the device 100 and a rod portion perpendicular to the plate portion. The rod portion can be made of the same material as the medium 106 and can provide thermal connection to the liquid in a bottle 102 without having to flip over the device 504. In some embodiments, the medium 106, in both the plate portion and the rod portion, is constructed or forged from the same material as a single component. A parent can unscrew the nipple section 110 and the cap ring 112 from the bottle 102 and twist the device 504 unto the top of the reservoir 114. The rod portion of the medium 106 can plunge into the liquid in the reservoir 114 providing thermal connection between the liquid and the medium 106. The device 504 can provide the same functionality as the device 100. Furthermore, the device 504 can provide heating and cooling of the liquid in the reservoir 114, without flipping over or rotating the device 504 and the attached reservoir 114. Besides the addition of the rod portion to the medium 106, the other components of the device 504 are identical to the device 100. As a result, the device 504 can also be operated as the device 100, for example, by a parent performing the operations 120, 130, 140 and 150 as described in relation to FIG. 1. When the operations 120, 130, 140 and 150 are performed, the liquid in the reservoir 114 can be warmed or cooled via both the plate and the rod portion of the medium 106. Alternatively, the parent need not flip over the attached device 504 to provide thermal contact with the medium 106, and instead can rely on the rod portion to provide thermal connection to the liquid.

In some embodiments, the device 100 can be attached to a reservoir 114 via an adapter 514. In this manner, the device 100 can be manufactured in one size, but can be attached to a variety of bottle shapes via various adapters 514 compatible with the bottles. The adapter 514 can include device-side threads 516 shaped to removably attach the adapter 514 to the threads 108 in the housing 104 by a twisting motion. The adapter 514 also includes reservoir-side threads 518 shaped to removably attach the adapter 514 to the threads 520 in the reservoir 114. Once the device 100 is attached to the reservoir 114 via the adapter 514, the device 100 can operate as described above in relation to FIGS. 1-4.

While the embodiments are described in the context of keeping a target temperature for breastmilk and baby formula for feeding infants and toddlers, a person of ordinary skill in the art can apply the same technology to other applications. For example, the described technology can be applied to any applications in which maintaining a target temperature of a liquid is desirable. Examples include medical device applications, industrial temperature-controlled liquid reservoirs of various shapes and sizes, consumer insulated tea and coffee mugs and other applications.

EXAMPLES

It will be appreciated that the present disclosure may include any one and up to all of the following examples.

Example 1: An apparatus comprising: a housing enclosing a thermally conductive medium, a thermoelectric module, a temperature sensor and a controller, the thermoelectric module thermally coupled to the medium, wherein the thermoelectric module has a medium-side in thermal contact with the medium and an ambient-side, opposite the medium-side, wherein applying a voltage differential to the sides of the thermoelectric module generates a temperature difference between the sides; the temperature sensor attached to the medium; and the controller configured to receive a temperature of the medium from the temperature sensor and modulate a voltage applied to the thermoelectric module based on a target temperature of the medium, wherein the housing is removably attachable to a liquid reservoir and attaching the housing to the reservoir thermally exposes the liquid to the medium.

Example 2: The apparatus of Example 1, wherein the housing further encloses a heatsink and a fan, wherein the heatsink is attached to the ambient-side and the fan is attached to the heat sink, wherein the fan and the heatsink drive the temperature of the ambient-side toward the ambient temperature.

Example 3: The apparatus of some or all of Examples 1 and 2, wherein the housing further encloses a heatsink and a fan, wherein the heatsink is attached to the ambient-side and the fan is attached to the heat sink, wherein the fan and the heatsink drive the temperature of the ambient-side toward the ambient temperature, wherein the housing further comprises an inlet vent on an a surface of the housing adjacent to the fan and an outlet vent on a surface of the housing adjacent to the heatsink.

Example 4: The apparatus of some or all of Examples 1-3, wherein the medium and the thermoelectric module are plates.

Example 5: The apparatus of some or all of Examples 1-4, wherein the medium is capping a top portion of the housing, the top portion of the housing comprising threads shaped to receive a reservoir of liquid, wherein twisting the reservoir into the threads seals the liquid between the reservoir and the housing, and rotating the attached reservoir and the housing in the direction of gravity places the housing on top of the reservoir thermally exposing the liquid to the medium by force of gravity.

Example 6: The apparatus of some or all of Examples 1-5, wherein the medium comprises a rod portion perpendicular to a plate portion, the plate portion having the medium side and the opposing ambient-side, wherein attaching the housing to the reservoir thermally exposes the liquid to the medium via the rod portion of the medium.

Example 7: The apparatus of some or all of Examples 1-6, further comprising one or more secondary batteries.

Example 8: The apparatus of some or all of Examples 1-7, further comprising a software application executable on a computing device and in communication with the controller.

Example 9: The apparatus of some or all of Examples 1-8, further comprising one or more secondary batteries providing the voltage to the thermoelectric module, wherein the controller modulating the voltage comprises pulse width modulating the voltage received from the batteries, based on the target temperature.

Example 10: An apparatus comprising: a housing enclosing a thermally conductive medium, a thermoelectric module, a temperature sensor and a controller, a thermally conductive medium; a thermoelectric module thermally coupled to the medium, wherein the thermoelectric module has a medium-side in thermal contact with the medium and an ambient-side, opposite the medium-side, wherein applying a voltage differential to the sides of the thermoelectric module generates a temperature difference between the sides; a temperature sensor attached to the medium; and a controller configured to receive a temperature of the medium from the temperature sensor and modulate a voltage applied to the thermoelectric module based on a target temperature of the medium, wherein the housing further comprises a thermally conductive chamber thermally coupled with the medium.

Example 11: The apparatus of Example 10, wherein the housing further encloses a heatsink and a fan, wherein the heatsink is attached to the ambient-side and the fan is attached to the heat sink, wherein the fan and the heatsink drive the temperature of the ambient-side toward the ambient temperature.

Example 12: The apparatus of some or all of Examples 10 and 11, wherein the housing further encloses a heatsink and a fan, wherein the heatsink is attached to the ambient-side and the fan is attached to the heat sink, wherein the fan and the heatsink drive the temperature of the ambient-side toward the ambient temperature, wherein the housing further comprises an inlet vent on an a surface of the housing adjacent to the fan and an outlet vent on a surface of the housing adjacent to the heatsink.

Example 13: The apparatus of some or all of Examples 10-12, wherein the medium and the thermoelectric module are plates.

Example 14: The apparatus of some or all of Examples 10-13, further comprising one or more secondary batteries.

Example 15: The apparatus of some or all of Examples 10-14, further comprising a software application executable on a computing device and in communication with the controller.

Example 16: The apparatus of some or all of Examples 10-15, further comprising one or more secondary batteries providing the voltage to the thermoelectric module, wherein the controller modulating the voltage comprises pulse width modulating the voltage received from the batteries, based on the target temperature.

Example 17: An apparatus of comprising: an adapter; a housing enclosing a thermally conductive medium, a thermoelectric module, a temperature sensor and a controller, the thermoelectric module thermally coupled to the medium, wherein the thermoelectric module has a medium-side in thermal contact with the medium and an ambient-side, opposite the medium-side, wherein applying a voltage differential to the sides of the thermoelectric module generates a temperature difference between the sides; the temperature sensor attached to the medium; and the controller configured to receive a temperature of the medium from the temperature sensor and modulate a voltage applied to the thermoelectric module based on a target temperature of the medium, wherein the housing is removably attachable to a liquid reservoir via the adapter and attaching the housing to the reservoir thermally exposes the liquid to the medium.

Example 18: The apparatus of Example 17, wherein the housing further encloses a heatsink and a fan, wherein the heatsink is attached to the ambient-side and the fan is attached to the heat sink, wherein the fan and the heatsink drive the temperature of the ambient-side toward the ambient temperature.

Example 19: The apparatus of some or all of Examples 17 and 18, wherein the medium is capping a top portion of the housing, the top portion of the housing comprising housing threads, wherein the reservoir comprises threads, wherein the adapter comprises housing-side threads shaped to removably attach the adapter to the housing threads via a twisting action, wherein the adapter comprises reservoir-side threads shaped to removably attach the adapter to the reservoir threads via a twisting action, wherein attaching the reservoir to the housing via the adapter seals the liquid in the reservoir between the reservoir and the housing, and rotating the reservoir and the housing in the direction of gravity, places the reservoir on top of the housing, thermally exposing the liquid to the medium.

Example 20: The apparatus of some or all of Examples 17-19, further comprising one or more secondary batteries providing the voltage to the thermoelectric module, wherein the controller modulating the voltage comprises pulse width modulating the voltage received from the batteries, based on the target temperature.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed is:

1. An apparatus comprising:
 a cylindrical housing, having an interior, an exterior, and an opening to the interior, the opening comprising threads on an inside wall of the housing in the interior of the housing;
 a separate liquid reservoir, with separate liquid reservoir threads, wherein the housing threads are complementary to the separate liquid reservoir threads, wherein the housing threads are adapted to provide removable attachment between the housing and the separate liquid reservoir in the opening;
 a thermally conductive medium plate, in the interior of the housing, running a cross section of the housing, below the threads in the opening, enclosing the interior of the housing, and sealing the interior of the housing from the exterior of the housing, leaving the housing threads and a portion of the medium plate exposed to the exterior of the housing;
 the interior comprising a thermoelectric module, the thermoelectric module thermally coupled to the thermally conductive medium plate, the interior further comprising a temperature sensor, coupled to the thermally conductive medium plate in the interior of the housing, the interior of the housing further comprising a controller circuit,
 wherein the thermoelectric module has a medium-side in thermal contact with the thermally conductive medium plate, and an ambient-side, opposite the medium-side, both the medium- and the ambient-sides being located in the interior of the housing, wherein applying a voltage differential to the medium- and ambient-sides of the thermoelectric module generates a temperature difference between the medium- and ambient-sides, wherein the controller circuit is configured to receive a temperature of the thermally conductive medium plate from the temperature sensor and modulate a voltage applied to the thermoelectric module, based on a target temperature of the thermally conductive medium plate, wherein twisting the housing threads into the separate liquid reservoir threads, removably attaches the housing and the separate liquid reservoir, generating a seal between the housing and the separate liquid reservoir via the portion of the thermally conductive medium plate exposed to the exterior of the housing, such that liquid in the separate liquid reservoir remains contained within the separate liquid reservoir, wherein rotating the attached separate liquid reservoir and the housing, in the direction of gravity:
  places the separate liquid reservoir on top of the housing, relative to the direction of gravity, and
  places the sealed liquid in contact with the thermally conductive medium plate, by force of gravity.

2. The apparatus of claim 1, wherein the interior of the housing further comprises a heatsink and a fan, wherein the heatsink is attached to the ambient-side and the fan is attached to the heat sink, wherein the fan and the heatsink drive the temperature of the ambient-side toward the ambient temperature.

3. The apparatus of claim 1, wherein the interior of the housing further comprises a heatsink and a fan, wherein the heatsink is attached to the ambient-side and the fan is attached to the heat sink, wherein the fan and the heatsink drive the temperature of the ambient-side toward the ambient temperature, wherein a portion of the housing further comprises an inlet vent on a surface of the housing adjacent to the fan and an outlet vent on a surface of the housing adjacent to the heatsink.

4. The apparatus of claim 1, wherein the thermoelectric module is in shape of a plate, coupled to the thermally conductive medium plate.

5. The apparatus of claim 1, further comprising one or more secondary batteries located in the interior of the housing.

6. The apparatus of claim 1, further comprising a software application executable on a computing device and in communication with the controller circuit.

7. The apparatus of claim 1, further comprising one or more secondary batteries providing the voltage to the thermoelectric module, wherein the controller circuit modulating the voltage comprises pulse width modulating the voltage received from the batteries, based on the target temperature.

* * * * *